United States Patent [19]
Massey et al.

[11] Patent Number: 5,099,825
[45] Date of Patent: Mar. 31, 1992

[54] BOILING WATER UNITS

[75] Inventors: Raymond D. Massey, Cambridge Park; Christopher R. Martin, Revesby; Stephen J. Chaplin, South Penrith, all of Australia

[73] Assignee: Zip Heaters (Australia) Pty Limited, New South Wales, Australia

[21] Appl. No.: 608,401

[22] Filed: Nov. 2, 1990

[30] Foreign Application Priority Data

Nov. 14, 1989 [AU] Australia .................... PJ7397

[51] Int. Cl.$^5$ .............................. A47J 27/58
[52] U.S. Cl. .................... 126/383; 285/94; 285/187; 285/161; 285/423
[58] Field of Search .............. 285/19, 20, 302, 423, 285/94, 165, 187, 161; 126/383

[56] References Cited

U.S. PATENT DOCUMENTS

| | | | |
|---|---|---|---|
| 1,462,768 | 7/1923 | Russell | 285/187 |
| 2,604,888 | 7/1952 | Ritter | |
| 3,645,563 | 2/1972 | Rochelle | 285/302 X |
| 3,977,708 | 8/1976 | Jopp | 285/423 X |
| 4,032,748 | 6/1977 | Vischer | 219/275 |
| 4,180,092 | 12/1979 | Hunter et al. | 285/165 X |
| 4,362,323 | 12/1982 | Lodder | 285/94 X |

FOREIGN PATENT DOCUMENTS

| | | |
|---|---|---|
| 531449 | 8/1983 | Australia . |
| 143619 | 5/1985 | European Pat. Off. . |
| 2082328 | 12/1971 | France . |
| 409305 | 9/1966 | Switzerland . |

*Primary Examiner*—Dave W. Arola
*Attorney, Agent, or Firm*—Robbins, Dalgarn, Berliner & Carson

[57] ABSTRACT

A connection arrangement between the holding tank and the heating tank in a boiling water unit in which a transfer pipe extends between the heating tank and the metering tube through which water is transferred from the holding tank. The transfer pipe is of Teflon construction and is elevated and internally chamfered at its end which extends into the heating tank. Connection joints are provided where the transfer pipe enters both the heating tank and the metering tube and each connection joint houses an expansion joint incorporating an O-ring and lubricant.

2 Claims, 1 Drawing Sheet

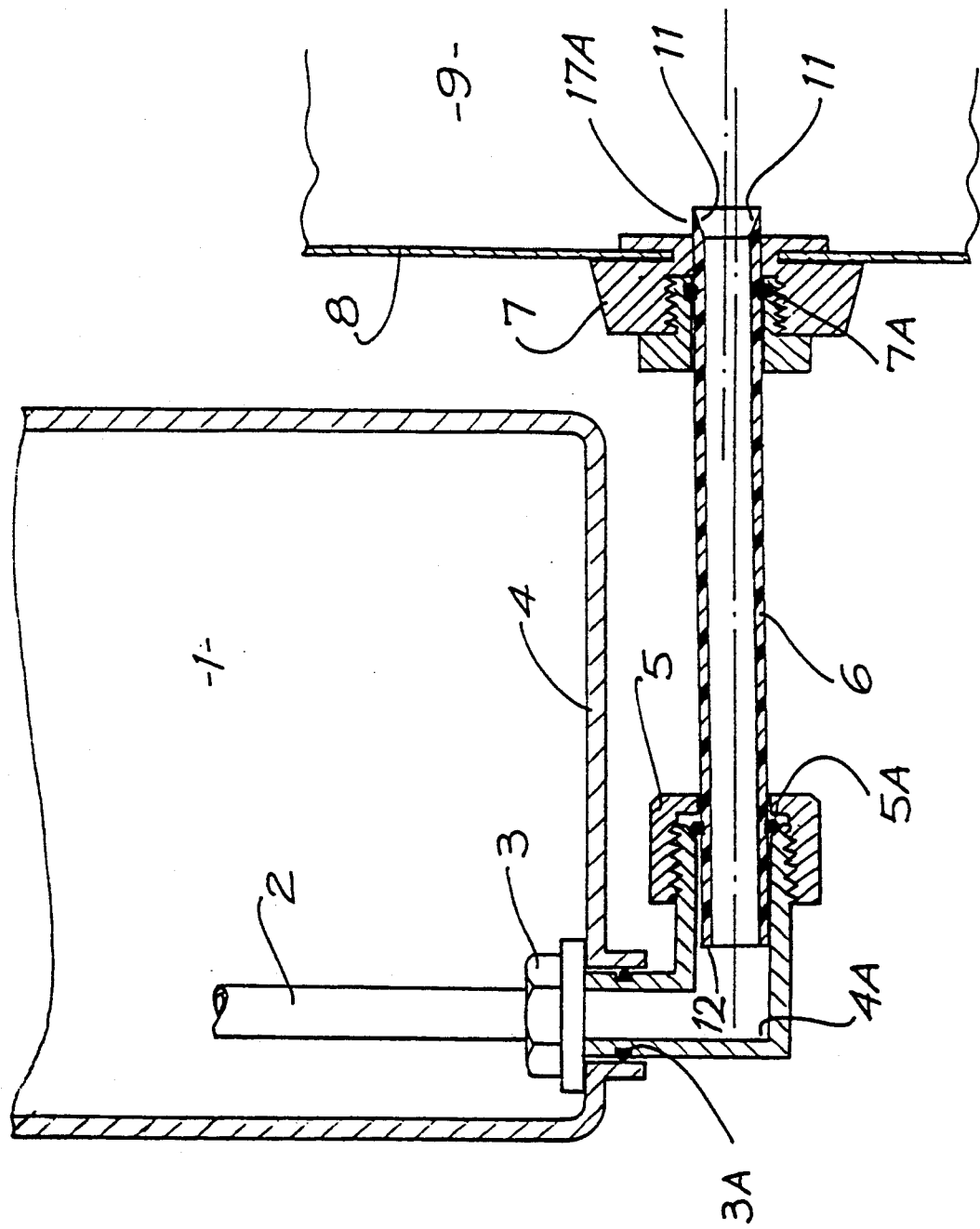

BOILING WATER UNITS

This invention relates to boiling water units such as are disclosed in the specification of Australian Patent No. 531449 the contents of which are incorporated herein by reference.

Boiling water units are required to be compact and aesthetically pleasing whilst performing the task of delivering water, provided to the unit by mains supply, in boiling or near boiling condition as and when required by the user.

Problems have arisen in the past with conventional boiling water units, despite their commercial success. Certain of these problems are addressed in the Applicant's copending Australian Patent application No. 64500/90.

A further problem resides in the transfer of water from the float chamber, where cold water is stored, to the heating/delivery chamber where water is heated to boiling point before being drawn off. Conventionally, a continuous transfer pipe or tube connects the float chamber with the heating chamber. Joints are provided between this transfer pipe and the float chamber and between the transfer pipe and the heating chamber. Further, there is an elbow joint in the transfer pipe.

If there is expansion or contraction in the float chamber, in the transfer pipe, or in the heating tank, strain may be placed on one or more of the specified joints causing potential leaks and possible distortion of the plastics float chamber.

It is an object of this invention to ameliorate the stated disadvantages of conventional boiling water units.

This invention in one broad form provides, in a boiling water unit a connection between the float chamber and the heating tank comprising a transfer pipe and a plurality of joints including connecting joints between the float chamber and the transfer pipe, each said connecting joint being provided with an expansion joint adapted for location around said transfer pipe, said expansion joints being adapted to accommodate movement of said transfer pipe occasioned by strain placed on one or more of said connecting joints.

The FIGURE is a cross-sectional, elevational view of one embodiment of the present invention.

It is preferred that the transfer pipe be constructed of Teflon (Registered Trade Mark) or other suitable material and that the expansion joints comprise O-rings disposed within the connecting joints in circular slots packed with a lubricant which operates between ambient and very high temperatures. The preferred such lubricant is available under the trade name "MOLYKOTE III" which operates between $-40°$ C. and $260°$ C. to resist both hot and cold environments, steam washout and harsh chemical attacks and is also competent to protect seals such as O-rings from oxidation to allow non-destructive disassembly. Thus, in the preferred construction, a seal is created between the connecting joint body and the transfer pipe, the construction being such that movement of the TEFLON pipe may occur whilst a water tight transfer system remains in place.

It is further preferred that the end of the transfer pipe where it enters the heating tank is chamfered and that the end of the transfer pipe as the heating tank end is elevated slightly compared with its opposite end. The combination of end chamfer and elevation of the transfer pipe is effective in the prevention of entrapment in the pipe of air bubbles which have deleterious effect on water flow between the float chamber and the heating tank.

By way of example only, one embodiment of a boiling water unit in accordance with this invention will now be described with reference to the accompanying drawing wherein:

Float chamber 1 is provided with metering tube 2 with connecting joint 3 connecting tube 2 to the bottom 4 of chamber 1. Metering tube 2 is elbowed at 4A and a further connecting joint 5 is provided adjacent the end of tube 2 to provide connection between tube 2 and one end of Teflon transfer pipe 6. A further connecting joint 7 provides connection between wall 8 of heating tank 9 and the other end 17A of transfer pipe 6. Each connecting joint 3, 5, 7 is provided with a circular groove accommodating, respectively, O-rings 3A, 5A, 7A. Each O-ring is packed in its respective groove with a heat resistant sealing lubricant such as MOLYKOTE III. End 17A of pipe 6, where the pipe enters heating tank 9 is chamfered as at 11 and transfer pipe 6 is inclined slightly upwardly at end 17A compared with end 12 thereof.

What we claim is:

1. In a boiling water unit, a connection between a float chamber and a heating tank comprising:
   a transfer pipe of TEFLON material having a first end located to receive water from the float chamber and a second end located in the heating tank to deliver water thereto;
   a first connecting joint having means surrounding the first end of the transfer pipe and securing the transfer pipe to the float chamber and having an expansion joint; and
   a second connecting joint having means surrounding the transfer pipe in the region of its entry to the heating tank and having an expansion joint,
   each surrounding means defining an annular groove in its interior, each groove being packed with a lubricant adapted to operate between ambient and very high temperatures,
   each expansion joint having an O-ring located in the annular groove of the respective surrounding means whereby the O-rings sealingly engage the respective surrounding means and the transfer pipe, and
   the second end of the transfer pipe being slightly elevated relative to the first end of the pipe.

2. The boiling water unit of claim 1 wherein:
   the transfer pipe is internally chamfered at the second end.

* * * * *